United States Patent
Terada et al.

(10) Patent No.: US 6,537,345 B1
(45) Date of Patent: Mar. 25, 2003

(54) METHOD FOR DECOMPOSITION AND TREATMENT OF BOND MAGNET

(75) Inventors: Takahiko Terada, Nara (JP); Hiroshi Onishi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/433,672

(22) Filed: Nov. 4, 1999

(30) Foreign Application Priority Data

Nov. 4, 1998 (JP) .......................................... 10-312924

(51) Int. Cl.⁷ .............................. B03B 1/02; B03B 1/04
(52) U.S. Cl. ........................................................ 75/392
(58) Field of Search .............................. 210/695; 75/392

(56) References Cited

U.S. PATENT DOCUMENTS

| | | | | |
|---|---|---|---|---|
| 4,568,612 A | * | 2/1986 | Lehner et al. | 428/425.9 |
| 5,246,503 A | * | 9/1993 | Minick | 134/38 |
| 6,129,847 A | * | 10/2000 | Wunsch et al. | 210/695 |

FOREIGN PATENT DOCUMENTS

| | | |
|---|---|---|
| EP | 06340902 | 12/1994 |
| EP | 0 999 566 A | 5/2000 |
| EP | 2000198878 | 7/2000 |
| EP | 1 091 007 A | 4/2001 |
| JP | 5-55018 | 3/1993 |
| JP | 07111208 | 4/1995 |
| JP | 7-111208 | 4/1995 |
| JP | 10-55908 | 2/1998 |
| JP | 10055908 | 2/1998 |

OTHER PUBLICATIONS

Condensed Chemical Dictionary, 10$^{th}$ ed., 1981, p. 287.*
N. Sato et al.. "Recovery of Samarium and Neodymium from Rare Earth Magnet Scraps by Fractional Crystallization Method", Fundamental study on the recycling of rare earth magnet (2$^{nd}$ report), p. 1082 (200) –1086 (2004).
Eurepean Search Report dated May 31, 2000, application No. 9912188432208.
International Search Report corresponding to application No. EP 00 12 3259 dated Dec. 19, 2001.

* cited by examiner

*Primary Examiner*—Daniel J. Jenkins
(74) *Attorney, Agent, or Firm*—RatnerPrestia

(57) ABSTRACT

A method for decomposition and treatment of a bond magnet, has:
 a decomposition process for making a bond magnet which is made by blending magnetic powder-like material with binder and being molded, contact with decomposition material which can decompose said binder, within a decomposition vessel;
 a removing process for removing oxygen in the decomposition vessel; and
 a heating process for heating the decomposition vessel in temperatures ranging from 250° C. to just under a critical temperature.

18 Claims, 1 Drawing Sheet

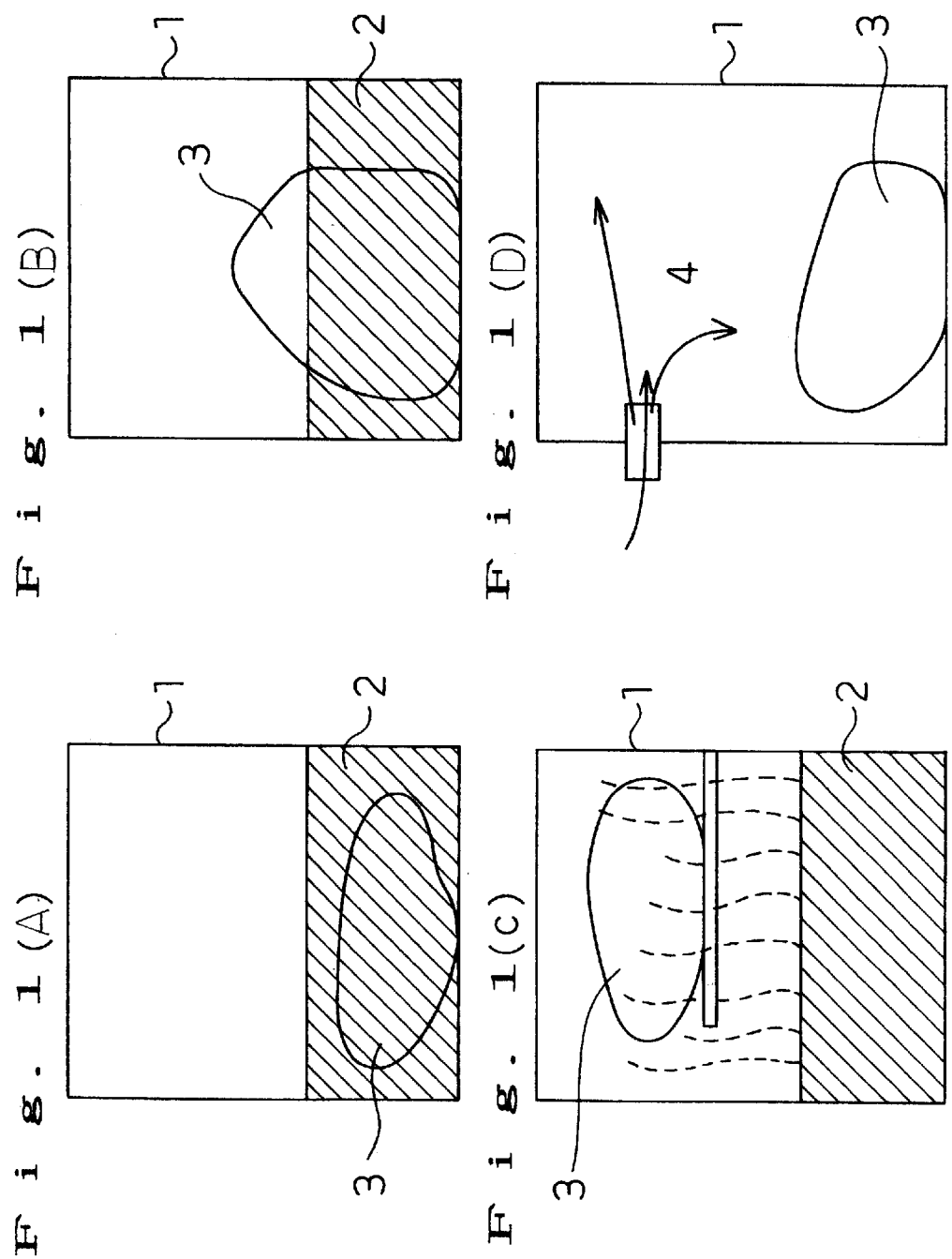

METHOD FOR DECOMPOSITION AND TREATMENT OF BOND MAGNET

BACKGROUND OF THE INVENTION

1. Field of the Invention

This invention relates to a method for decomposition of a bond magnet, which is superior in dimensional accuracy and processing and is widely applied to industrial materials.

2. Related Art of the Invention

A bond magnet is a magnet molded by blending hard magnetic powder-like material with binder such as plastics and rubber. Every type of hard magnetic materials is generally hard and fragile in quality. Process for manufacturing the materials are generally performed finally by finish machining in order to realize a fixed size by molding, sintering and heat-treating. As a result, high processing cost is unavoidable for use requiring strict dimensional allowance, and thus significant increases in product cost may be caused. Further, complexly-shaped or thin materials are difficult to produce. A bond magnet is manufactured for the purpose of resolving these disadvantages in processing. The bond magnet is characterized in that it has high dimensional accuracy in processing, a complexly-shaped or thin material, or the like, is easy to process without fractured and chipped, and furthermore it is light in weight. Since the bond magnet contains 2–15 wt % (25–50 vol %) of non-magnetic material binder, magnetic characteristics are inferior to a casing magnet or sintered magnet. However, since powerful magnetic powder such as rare-earth magnet could be obtained, characteristics of a magnet are rapidly improved and such a powerful magnet is used widely.

On the other hand, since a bond magnet is manufactured as a blend of binder and magnetic powder-like material, decomposition and reuse for resources of the used bond magnet or bond magnet with inferior quality are difficult. Especially, in the case where the binder is thermosetting resin, insoluble and non-melting three-dimensional solid structures are generally produced by curing reaction. Therefore, cured resin was difficult to decompose and was not proper for recycling and reuse.

Considering the increasing serious problems of waste and effective use of resources, the development of processing technology for reducing the volume of waste, waste treatment technology for reuse, or the like, for the used and inferior bond magnet is urgently required. Especially, the bond magnet is mainly made of metal, metallic oxide or the like, and metals or the like are more expensive materials than resinous binder materials. Consequently, the fact that reclamation and reuse of such expensive materials cannot be performed, is a large problem. Moreover, in case of a magnet made of rare earth metals such as cobalt, neodymium or the like, or other materials, the problems are still more serious. A bond magnet, which is manufactured by using thermosetting resin such as epoxy resin or the like as a binder, is completely difficult to decompose. A method for decomposition of any type of bond magnet in order to isolate metals such as rare earth metals or the like from the bond magnet is required.

Any conventional configuration or method for decomposition of a bond magnet cannot be sufficiently applied for reuse or recycle as resources at present.

An object of the present invention is to provide an easy and simple method for decomposition of a bond magnet.

A method of the present invention for decomposition and treatment of a bond magnet, comprises:

a decomposition process for making a bond magnet which is made by blending magnetic powder-like material with binder and being molded, contact with decomposition material which can decompose said binder, within a decomposition vessel;

a removing process for removing oxygen in the decomposition vessel; and a heating process for heating the decomposition vessel in temperatures ranging from 250° C. to just under a critical temperature.

A process for removal of oxygen is preferably to exhaust the gas in the decomposition vessel after replacing the gas in the decomposition liquid with nitrogen gas by supplying nitrogen gas, and then to reduce the pressure in the decomposition vessel.

A method of the present invention for decomposition and treatment of a bond magnet, comprises:

a decomposition process for making a bond magnet which is made by blending magnetic powder-like material with binder and being molded, contact with decomposition material within a decomposition vessel, said decomposition material containing at least one solvent selected from the group including tetralin, biphenyl, naphthalene, methylnaphthalene, 1,4-hydroxynaphthalene, naphthol, 1,4-naphthoquinone, pitch, creosote oil, methylisobutyl ketone, isophorone, 2-hexanone, 2-heptanone, 4-heptanone, diisobutylketone, acetonylacetone, phorone, cyclohexanone, methylcyclohexanone and acetophenone; and a heating process for heating the decomposition vessel in temperatures ranging from 250° C. to just under a critical temperature.

In the method for decomposition of the present invention, a liquid for decomposition is preferable to contain antioxidant or reducing agent.

Antioxidant or reducing agent is preferably at least a compound selected from the group consisting of hydroquinone, methoquinone, benzoquinone, naphthoquinone, butylcatechol, butylhydroquinone, sodium hyposulphite, soduim thiosulfate and ascorbic acid.

In the method for decomposition of the present invention, a preferable example of the bond magnet, which is molded by blending magnetic powder-like material with binder, is the bond magnet consisting of a rare-earth magnet containing a rare earth element as a magnet material.

BRIEF DESCRIPTION OF THE DRAWINGS

FIG. 1 shows schematic sectional view in order to explain embodiments of the present invention.

(Code Description)

1 decomposition vessel
2 decomposition liquid material
3 bond magnet
4 decomposition gas

PREFERRED EMBODIMENTS OF THE INVENTION

The bond magnet provided for primary decomposition process of the present invention is molded and cured with plastics or rubber as a binder. It is classified according to a type of binder and hard magnetic powder-like material in use. A bond magnet using plastics as a binder is referred to a plastic bond magnet. Examples of plastics are nylon resin, polyphenylenesulfide and epoxy resin. Examples of magnetic powder-like material are mainly oxide magnet and rare-earth magnet. In the oxide magnet, alnico magnet or ferrite magnet can be used. In the rare-earth magnet, rare-earth cobalt alloy such as $SmCo_6$ or $SmTl_7$ alloy, or neodymium-based compounds such as $Nd_2Fe_{14}B$ can be used.

A decomposition liquid used in a method for decomposition treatment in the first step of the process of the present invention includes at least a solvent selected from the group consisting of ethylene glycol, propylene glycol, diethylene glycol, dipropylene glycol, isoprene glycol, triethylene glycol, 2-methoxyethanol, 2-ethoxyethanol, 2-(methoxymethoxy)ethanol, 2-isopropoxyethanol, 2-butoxyethanol, 2-(isopentyloxy)ethanol, 2-(hexyloxy)ethanol, 2-phenoxyethanol, 2-(benzyloxy)ethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, diprolylene glycol monoethyl ether, triethylene glycol monomethyl ether, tripropylene glycol monomethyl ether and tetraethylene glycol.

Further, in the present invention, a process for exhausting oxygen in the decomposition vessel is required in order to prevent oxidative degradation of solvent or magnet powder. An example of exhausting oxygen is a process for replacing the gas in the decomposition vessel as well as in a decomposition liquid with nitrogen gas by supplying nitrogen gas. Supply of nitrogen gas is performed by directly supplying nitrogen gas from nitrogen gas bottle through a gas inlet and an exhaust valve equipped on the decomposition vessel, to which the bond magnet and the decomposition liquid are prepared. Another example is a process for reducing pressure and exhausting the gas in the decomposition vessel.

As another example reducing pressure can be performed by using a vacuum pump through the exhausting valve equipped to the decomposition vessel, in which cured resin and decomposition liquid are set. In either process, exhausting oxygen can effectively be performed by agitating and heating the decomposition liquid.

A preferable process is vacuum exhaustion of gas in the decomposition vessel after replacing the gas in the decomposition liquid with nitrogen gas by supplying nitrogen gas.

As a result of decomposition treatment after pretreatment with oxygen exhaustion, oxidation, which is a main cause for degradation of the decomposition liquid in a treatment at high temperature reaction, can be prevented, as well as life time of decomposition liquid is extended and repeated usability is improved. In addition, oxidative deterioration of alloys configuring magnet powder in the bond magnet can be prevented. Consequently, quality of recovered magnet powder can be improved. Especially, since the rare earth metal such as neodymium or the like is easy to oxidize, such a process is effective for maintaining post-treating quality.

The decomposition liquid provided for the secondary decomposition process of the present invention includes at least a solvent selected from the group consisting of tetralin, biphenyl, naphthalene, methylnaphthalene, 1,4-hydroxynaphthalene, naphthol, 1,4-naphthoquinone, pitch, creosote oil, methylisobutyl ketone, isophorone, 2-hexanone, 2-heptanone, 4-heptanone, diisobutyl ketone, acetonylacetone, phorone, cyclohexanone, methylcyclohexanone and acetophenone.

These solvents are stable at high temperature, generate oxygen by autodecomposition and rarely induce oxidation of metals or the like contained in the bond magnet. Consequently, pretreatment such as removing oxygen is not always required. However, in the case where oxidation of trace metals in the bond magnet should be avoided, or the pretreatment process for removal of oxygen can be set for extension of life time of the decomposition liquid.

In the above explained present invention, the contact of the bond magnet to the decomposition material in the decomposition vessel means that the bond magnet is not always required to be completely dipped in the liquid phase of the decomposition material (see FIG. 1(A). It is sufficient that a part of the bond magnet is dipped in a liquid phase of the decomposition material and the remaining part of the bond magnet is exposed to a gas phase of the decomposition material (see FIG.(B)) and also that whole bond magnet is not dipped in a liquid phase but exposed to a gas phase(see FIG. 1(C)). Further it is sufficient that the there is only a gas phase of the decomposition material in the vessel and the bond magnet is exposed to the gas phase(see FIG. 1(D)). And the decomposition material can be gas phase and/or liquid phase as described above.

In the FIG. 1 number 1 indicates a decomposition vessel, number 2 indicates liquid phase of the decomposition material, number 3 indicates a bond magnet, number 4 indicates a gas phase of the decomposition material.

Further, in the above explained present invention, temperature in the soaking into the decomposition liquid is preferably high temperature for obtaining a higher decomposition reaction-rate, and especially the reaction rate is markedly accelerated at above 250° C. However, in the case where temperature of the decomposition liquid is too high, the pressure of the inner vessel reaches too high and this requires a high pressure resistant vessel; a large volume of gas components generated by decomposition makes it difficult to recover the generated gas; degradation of the decomposition liquid itself will occur; and deterioration reaction such as oxidation of the magnet will be increased. Consequently, temperature in the soaking process is preferably below a critical temperature. For example, the critical temperature of propyleneglycol is 351° C. As a result, in the soaking process, the decomposition liquid is heated preferably at above 250° C. and below the critical temperature.

In addition, antioxidants or reducing agents may be directly added to the decomposition liquid in order to prevent oxidative degradation of the solvent or the metallic components of the magnet.

Preferably, as the antioxidants and reducing agents, at least one compound may be selected and used from the group consisting of hydroquinone, methoquinone, benzoquinone, naphthoquinone, butylcatechol, butylhydroquinone, sodium hypophosphite, sodium thiosulfate and ascorbic acid.

These compounds have preferable solubility and effectiveness for the decomposition liquid used in the present invention.

These antioxidants or reducing agents are used in a ratio of 0.2–10 weight parts, preferably 1–5 weight parts, parts for the decomposition liquid 100 weight parts.

As a result of soaking the bond magnet into the decomposition liquid containing at least a solvent selected from the group consisting of ethylene glycol, propylene glycol, diethylene glycol, dipropylene glycol, isoprene glycol, triethylene glycol, 2-methoxyethanol, 2-ethoxyethanol, 2-(methoxymethoxy)ethanol, 2-isopropoxyethanol, 2-butoxyethanol, 2-(isopentyloxy)ethanol, 2-(hexyloxy)ethanol, 2-phenoxyethanol, 2-(benzyloxy)ethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, diprolylene glycol monoethyl ether, triethylene glycol monomethyl ether, tripropylene glycol monomethyl ether and tetraethylene glycol, and heating the mixture, the binder is chemically decomposed. The three-dimensional cross-linked structure of thermosetting resin such as epoxy resin or the like can be decomposed. In addition, the solvent such as tetralin, biphenyl, naphthalene, methylnaphthalene, 1,4-hydroxynaphthalene, naphthol, 1,4-naphthoquinone, pitch, creosote oil, methylisobutyl ketone, isophorone, 2-hexanone, 2-heptanone, 4-heptanone, diisobutyl ketone, acetonylacetone, phorone, cyclohexanone, methylcyclohexanone or acetophenone or the like under heating can provide a preferable liquid phase for decomposition of the binder and the thermo-decomposition reaction of the binder can be proceeded effectively. The thermosetting resin such as epoxy resin or the like, which is conventionally difficult to decompose in the prior arts, can be easily and effectively decomposed.

As a result of decomposition of the binder, a binding force of the cured bond magnet is reduced to disintegrate the bond magnet. Namely, magnetic powder in the bond magnet, which is bound with the binder, cannot maintain to bind the magnetic powder. Consequently, the magnetic powder is easily separated from the binder composition. The composition of the decomposed binder can be recovered as monomers in the form of solid, oil or solute in the solution depending on their solubilities.

According to the method for decomposition of bond magnet of the present invention, the binders, such as thermosetting epoxy resin or the like which is difficult to decompose, can easily be disintegrated. Furthermore, the magnet powder can be recovered after decomposition.

The present invention will be explained in detail by illustrating the embodiments in the following.

(Embodiment 1)

An embodiment in the following will specifically explain a mode of operation of the method for decomposition of the cured resin of the present invention.

In the present embodiment, the method for decomposition of the present invention will be exemplified by using the bond magnet of the cured resin product, which is manufactured by aggregating cured rare-earth magnetic powder with epoxy resin as a binder.

In the present embodiment, Nd—Fe—B magnet is used among the rare-earth magnets, although SmCo magnet is also known as the rare-earth magnet.

To Nd—Fe—B magnet powder was blended 3% w/w epoxy resin, then the blended material was again ground to pulverize. The ring-shaped bond magnet was manufactured by compression molding. The product was used for a test of decomposition treatment.

The ring-shaped bond magnet was treated for decomposition by soaking into the decomposition liquid, which contained at least a solvent selected from the group consisting of ethylene glycol, propylene glycol, diethylene glycol, dipropylene glycol, isoprene glycol, triethylene glycol, 2-methoxyethanol, 2-ethoxyethanol, 2-(methoxymethoxy)ethanol, 2-isopropoxyethanol, 2-butoxyethanol, 2-(isopentyloxy)ethanol, 2-(hexyloxy)ethanol, 2-phenoxyethanol, 2-(benzyloxy)ethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, diprolylene glycol monoethyl ether, triethylene glycol monomethyl ether, tripropylene glycol monomethyl ether and tetraethylene glycol. In the present embodiment, the decomposition liquid consisting of ethyleneglycol was used. The bond magnet was soaked into the decomposition liquid in the decomposition vessels, which were then sealed. A vacuum pump is connected to a nozzle equipped with each vessel, and the gas in the vessels was exhausted to reduce the pressure. The vessels were heated at 270° C. for 5 hours. Then, each vessel was heated at 200, 230, 240, 250 and 300° C., respectively. The same operation was conducted only at 270° C. without exhausting gas from the vessel.

Results were as follows. In the treatments for decomposition performed at 200, 230 and 240° C., respectively, the bond magnets remained their shapes without changing the strength, though the color of resin was slightly changed. In the treatments for decomposition performed at above 250° C., i.e. at 250, 270 and 300° C., respectively, resin binders were completely disintegrated and were dissolved or dispersed into the decomposition liquid, in which the magnetic powder was precipitated in the bottom of the vessels. The test at 270° C. without exhausting the gas and reducing the pressure by vacuum pump showed disintegration of the bond magnet and precipitation of the magnet powder.

In the case where pretreatment with vacuum exhaustion was performed, a maximum pressure in the decomposition vessel at the decomposition treatment was 10 kg/cm$^2$, which was almost same pressure at 300° C. of ethylene glycol, and treated decomposed liquid showed slightly brownish colored with precipitation derived from decomposed resin. On the contrary, in the case where no gas exhaustion and pressure reduction were performed, the maximum pressure in the vessel under decomposition treatment exceeded 40 kg/cm$^2$. This produced a large amount of gas generation, showing dark brownish colored liquid after decomposition treatment, which indicated progressed disintegration of the decomposition liquid.

The magnet powder recovered after separation, metallic gloss was observed in the treatment of deaeration by pressure reduction, but the magnet powder without pretreatment showed totally black color. These results indicate the less oxidative degradation in the pretreatment.

As shown in the above, the bond magnet, which contains the binder consisting of thermosetting resin, i.e. epoxy resin, and is soaked into the decomposition liquid consisting of ethyleneglycol, then heated at 250° C., can be rapidly decomposed. In addition, exhaustion by pressure reduction results in reducing the pressure at the decomposition treatment as well as suppressing disintegration of the decomposition liquid and generation of decomposed gas. Further, oxidation of the recovered magnetic powder can be prevented and the high quality of metals and other materials can be recovered.

In conclusion, the present treatment method for including exhaustion of gas in the decomposition vessel to reduce inner pressure and heating above 250° C. is the excellent method for treatment, by which the binder is easily decomposed and the magnetic powder can easily be recovered with maintaining high quality as well as less degradation of the decomposition liquid.

The reduced pressure is preferably as vacuum as possible, more preferably below 10 mm Hg.

The temperature in the decomposition treatment is not limited within the present embodiment and is preferably within the range below the critical temperature above 250° C.

Further, compositions and constitution of bond magnet, which contains binder of epoxy resin, are not limited within the scope of the present embodiment. The other resins and rubbers can be used. Also, the magnetic powder-like materials can be the other rare-earth magnet, alnico magnet or the like.

In the present embodiment, ethyleneglycol is exemplified as the decomposition liquid, but is not limited in the compositions and blending ratio within such an embodiment. These include at least a solvent selected from the group consisting of ethylene glycol, propylene glycol, diethylene glycol, dipropylene glycol, isoprene glycol, triethylene glycol, 2-methoxyethanol, 2-ethoxyethanol, 2-(methoxymethoxy)ethanol, 2-isopropoxethanol, 2-butoxyethanol, 2-(isopentyloxy)ethanol, 2-(hexyloxy)ethanol, 2-phenoxyethanol, 2-(benzyloxy)ethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, diprolylene glycol monoethyl ether, triethylene glycol monomethyl ether, tripropylene glycol monomethyl ether and tetraethylene glycol.

In the present embodiment, the decomposition liquid was used without any addition of other components, however antioxidant or reducing agent, for example, hydroquinone, methoquinone, benzoquinone, naphthoquinone, butylcatechol, butylhydroquinone, sodium hyposulfite, sodium thiosulfate, ascorbic acid or the like can be added for recovery of good quality of metals or the like.

In the process, reduced pressure can be replaced with supplying nitrogen gas, and the replaced nitrogen gas is also exhausted by pressure reduction to achieve less oxidative deterioration.

The decomposition liquid can be repeatedly used by removing the dissolved materials, or can be used for fuel as oil as it is.

(Embodiment 2)

The embodiment of the method for decomposition of cured resin of the present invention will be explained.

In the present embodiment, the method for decomposition of the present invention will be explained by exemplifying the bond magnet, which is a resinous cured substance, cured by aggregation with ferrite powder and epoxy resin as a binder.

A composition of ferrite material is expressed by the rational formula $Mo_xFe_2O_3$, wherein M is Ba (barium), Sr (strontium) or Pb (lead), and x is 4.5–6.5. A bond magnet was prepared by blending ferrite powder with 5% w/w nylon resin and injection molding to produce ring-shaped bond magnet, which was used for decomposition test.

The ring shaped bond magnet was subjected to decomposition treatment by soaking into the decomposition liquid containing at least a solvent selected from the group consisting of tetralin, biphenyl, naphthalene, methylnaphthalene, 1,4-hydroxynaphthalene, naphthol, 1,4-naphthoquinone, pitch, creosote oil, methylisobutyl ketone, isophorone, 2-hexanone, 2-heptanone, 4-heptanone, diisobutyl ketone, acetonylacetone, phorone, cyclohexanone, methylcyclohexanone and acetophenone. Methylisobutyl ketone was used as the decomposition liquid in the present embodiment. The bond magnet was soaked into the decomposition liquid at 280° C. for 5 hours.

As a result, binder of resin was decomposed and the bond magnet was decomposed and never remained its original molded form. Decomposed resin was dissolved or dispersed in the solvent and the ferrite powder was precipitated. The precipitate was separated by filtration, washed with solvent such as acetone or the like to recover the ferrite powder after drying. This powder can be reused for the bond magnet or sintered magnet.

As shown in the above, the resin component of the bond magnet, which was a resinous cured material containing binder of nylon resin of the thermosetting resin, was soaked in the methylisobutyl ketone as a decomposition liquid to decompose rapidly the resin content, then the magnetic powder-like material could be recovered separately. The process of the present embodiment is to provide recovery of valuable materials and reduced volume of waste bond magnet. Further decomposed resin can also be reused as a raw resin material such as a monomer or the like.

Further, in the present embodiment, the decomposition liquid was used without any addition of other components, however antioxidant or reducing agent, for example, hydroquinone, methoquinone, benzoquinone, naphthoquinone, butylcatechol, butylhydroquinone, sodium hyposulfite, sodium thiosulfate, ascorbic acid or the like can be added for recovery of good quality of metals or the like.

Further, the composition, the constitution or the like of a bond magnet, which contains binder of nylon resin, is not limited within the scope of the present embodiment. Other resins and rubber scan be used. Also, the magnetic powder-like materials can be other rare-earth magnets, alnico magnet or the like.

Further, the temperature in the decomposition treatment is not limited within the present embodiment and is preferably within the range below the critical temperature above 250° C.

In the present embodiment, tetralin was shown as the example of the decomposition liquid, however a composition, a combining ratio or the like cannot be limited, and is sufficient to contain at least a solvent selected from the group consisting of tetralin, biphenyl, naphthalene, methylnaphthalene, 1,4-hydroxynaphthalene, naphthol, 1,4-naphthoquinone, pitch, creosote oil, methylisobutyl ketone, isophorone, 2-hexanone, 2-heptanone, 4-heptanone, diisobutyl ketone, acetonylacetone, phorone, cyclohexanone, methylcyclohexanone and acetophenone.

In the present invention, pretreatment of the decomposition vessel was not performed before decomposition treatment is initiated. However, if the deterioration reaction such as slight oxidation or the like of the magnetic material is disadvantageously caused, pressure reduction by exhaustion or exhaustion by replacement with nitrogen can be applied, and further exhaustion by pressure reduction after the replacement with nitrogen is preferable for treatment with less oxidative disintegration or the like.

Further, the decomposition liquid can be repeatedly used by removing the dissolved materials, or can be used for fuel as oil as it is.

(Embodiment 3)

The embodiment of the method for decomposition of cured resin of the present invention will be explained.

In the present embodiment, the method for decomposition of the present invention will be explained by exemplifying the bond magnet, which is a resinous cured substance, cured by aggregation with rare-earth magnet powder and epoxy resin as a binder.

In the present embodiment, Nd—Fe—B magnet is used among the rare-earth magnets, although an SmCo magnet or the like is also known as the rare-earth magnet.

To Nd—Fe—B magnet powder was blended 3% w/w epoxy resin, then the blended material was again ground to pulverize. The ring-shaped bond magnet was manufactured by compression molding. The product was used for a test of decomposition treatment.

The ring shaped bond magnet was subjected to decomposition treatment by soaking into the decomposition liquid containing at least a solvent selected from the group consisting of tetralin, biphenyl, naphthalene, methylnaphthalene, 1,4-hydroxynaphthalene, naphthol, 1,4-naphthoquinone, pitch, creosote oil, methylisobutyl ketone, isophorone, 2-hexanone, 2-heptanone, 4-heptanone, diisobutyl ketone, acetonylacetone, phorone, cyclohexanone, methylcyclohexanone and acetophenone. Tetralin was used as the decomposition liquid in the present embodiment. The bond magnet was soaked into the decomposition liquid at 280° C. for 3 hours.

As a result, binder of resin was decomposed and the bond magnet was decomposed and never remained its original molded form. Decomposed resin was dissolved or dispersed in the solvent and the Nd—Fe—B powder was precipitated. The precipitate was separated by filtration, washed with solvent such as acetone or the like to recover the Nd—Fe—B powder after drying. This powder can be reused for the bond magnet or sintered magnet. Although the rare earth metal such as Nd or the like is a metal which is easily oxidized or corroded, in the present method of treatment, no such effects were observed and the material could be reused as the magnetic material. Since tetralin is a solvent, which disintegrates resin, and is a reductive solvent, alloys in the bond magnet can be recovered in the stable state. Biphenyl, which is not used in the present embodiment, has the same nature, too. In case of isophorone, methylisobutyl ketone or the like, which have oxygen molecules in their structure and have oxygen sources, these molecules do not easily supply oxygen by thermal decomposition, consequently oxidation or the like of the magnet cannot be accelerated.

As shown in the above, the resin component of the bond magnet, which was a resinous cured material containing binder of epoxy resin of the thermosetting resin, was soaked in the tetralin as a decomposition liquid to decompose rapidly the resin content, then the magnetic powder-like material could be recovered separately. The process of the present embodiment is to provide recovery of valuable materials and volume reduction of a waste bond magnet. In addition, the present process is a method for treatment of the quality of metals to be recovered, and is a very effective method for disintegrating treatment of an easily corrosive rare-earth bond magnet.

In the present embodiment, the decomposition liquid was used without any addition of other components, however antioxidant or reducing agent, for example, hydroquinone, methoquinone, benzoquinone, naphthoquinone, butylcatechol, butylhydroquinone, sodium hyposulfite, sodium thiosulfate, ascorbic acid or the like can be added for recovery of good quality of metals or the like.

Further, the composition, the constitution or the like of a bond magnet is not limited within the scope of the present embodiment. Other resins can be used. No relation to isotropy or anisotropy of the rare-earth magnet is observed. The composition can be modified: a part of Fe is optionally replaced with Co in order to increase anticorrosive nature or the like, or other rare earth metals such as Pr or the like can be added. Also, the magnetic powder-like materials can be other rare-earth magnets or an alnico magnet.

The temperature in the decomposition treatment is not limited within the present embodiment and is preferably within the range below the critical temperature above 250° C.

In the present embodiment, tetralin was shown as the example of the decomposition liquid, however a composition, a combining ratio or the like cannot be limited, and is sufficient to contain at least a solvent selected from the group consisting of tetralin, biphenyl, naphthalene, methylnaphthalene, 1,4-hydroxynaphthalene, naphthol, 1,4-naphthoquinone, pitch, creosote oil, methylisobutyl ketone, isophorone, 2-hexanone, 2-heptanone, 4-heptanone, diisobutyl ketone, acetonylacetone, phorone, cyclohexanone, methylcyclohexanone and acetophenone. The solvent can be a single solvent, or mixed solvent such as a mixture of isophorone and methylisobutyl ketone or the like.

In the present invention, pretreatment of the decomposition vessel was not performed before decomposition treatment is initiated. However, if slight oxidation or the like of the magnetic material is disadvantageously caused, pressure reduction by exhaustion or exhaustion by replacement with nitrogen can be applied, and further exhaustion by pressure production after the replacement with nitrogen is preferable for treatment with less oxidative disintegration or the like.

The decomposition liquid can be repeatedly used by removing the dissolved materials, or can be used for fuel as oil as it is.

Comparative Example 1

A comparative example for the method for decomposition and treatment of the present invention will be shown as follows. The bond magnet used in the embodiment 3 was soaked into the decomposition liquid consisting of n-tetradecane at 300° C. for 5 hours. A rate of infiltration of the decomposition liquid and a surface hardness of the resinous cured material after soaking treatment with decomposition liquid were measured. As a result, no changes were observed in the appearance of cured materials. Further, neither the infiltration of the decomposition liquid into the resinous cured material nor the decrease in the hardness was observed. Namely, decomposition and treatment effects using decomposition liquid consisting of n-tetradecane cannot be expected.

Comparative Example 2

A comparative example of the method for decomposition and treatment of the present invention will be shown as follows. The bond magnet used in the embodiment 3 was soaked into the decomposition liquid consisting of liquid paraffin at 300° C. for 5 hours. A rate of infiltration of the decomposition liquid and a surface hardness of the resinous cured material after soaking treatment with decomposition liquid were measured. As a result, no changes were observed in the appearance of cured materials. Further, neither the infiltration of the decomposition liquid into the resinous cured material nor the decrease in the hardness was observed. Namely, decomposition and treatment effects using decomposition liquid consisting of liquid paraffin cannot be expected.

Further we compare the present invention with a conventional method using mechanical decomposition process and a conventional method using heating decomposition process.

As a method of the present invention, the bond magnet, in which epoxy resin was used as binder, and tetralin were mixed in the decomposition vessel. Oxygen in the vessel was exhausted by replacement of the oxygen with nitrogen gas as a pretreatment, and thereafter the vessel was heated up to 300° C. for 2 hours.

As a result, epoxy resin with the binder was decomposed and the bond magnet was disintegrated to precipitate the magnetic powder in the bottom of the vessel. The precipitate was recovered and washed with acetone to obtain the magnetic powder, which was reused for manufacture of the bond magnet.

Comparative Example 3

The recycling method of the present invention was compared with the conventional method in order to prove the superiority of the present invention. As for the prior art, a method for mechanical treatment was examined. For comparison, a grinding method was applied as the mechanical means. A bond magnet, which was cured and molded by using epoxy resin as a binder, and was subjected to impact grinding. Recovered powder was used to manufacture again the bond magnet. The impact grinding was performed by that the bond magnet and zirconia balls φ5 mm were set in the nylon cylinder shaped pot and were shaken by using a paint shaker. The ground powder prepared by the mechanical means had a disadvantage in that mulling with binder resin was inferior compared to the product of the present invention.

Comparative Example 4

The recycling method of the present invention was compared with the conventional method in order to prove the superiority of the present invention. As for the prior art, a method for thermal treatment was examined. A thermal treatment method was measured by thermal decomposition of the binder. In that condition, since thermal decomposition in the air generates oxidation of the rare-earth magnet, the treatment was conducted by dry distillation under nitrogen atmosphere. The bond magnet with epoxy resin as a binder was dry distilled in the silica tube to decompose epoxy resin. Oxygen concentration in the dry distillation was below 1% and combustion was proceeded at 300–500° C.

In any temperature tested, no appearance was changed, and no deterioration of strength was observed. The recovered powder treated by the zirconia ball treatment was sued for preparation of plastic bond magnet. The impact grinding was performed as the same method as in the above comparative method 1.

(Measurement of Magnetic Characteristics)

The produced plastic bond magnets were magnetized at 50 kOe. The magnetic characteristics and magnetic density were measured as a property of a permanent magnet, such as remanent magnetic flux density and coercive force by VSM measurement. The magnetic characteristics were obtained by measuring remanent magnetic flux density (Br) which indicated the strength of magnetization, coercive force (Hci) which was a force to coerce magnetization and maximum magnetic energy product (BHmax) which indicated the ability of a magnet. Each measured value was summarized in the table in comparison with that of the present material.

The characteristics of the recycled magnet showed a remnant magnetic flux density of 98.7%, a coercive flux of 92.8% and a maximum magnetic energy product of 91.6% that shows the capacity of a magnet, compared to the original magnet. Consequently, the recycled magnet of the present invention is almost identical with the original magnet in its character.

The mechanical treated grinding magnet showed bad blending with the binder resin, and as a result, the low density bond magnet was produced. Since the decomposition treatment was performed only by mechanical grinding, the remaining cured resin absorbed again the newly blended resin and resulted in making no good dispersion and decreasing mulling ability. Further, the total amount of resin was increased, and as a result, remanent magnet flux density was decreased. The coercive force was not so largely decreased with maintaining at 83.9% of the present original product. As a result in total, the maximum magnetic energy product is not so high and is approximately 40% of the original product.

In the dry distilled and ground product, although the product was treated by grinding, some of its resinous components, even if they are a small quantity, are decomposed and then released by distillation treatment, and good dispersion with resin was observed as compared with the ground product. The remanent magnetic flux density was also improved, however, is still lower than the present product. The remanent magnetic flux density resulted in a low level. The coercive force is almost on an identical level with the grinding magnet. The maximum magnetic energy product is about 54% of the present product.

The results indicate that the conventional process cannot remove the cured binder, consequently magnetic flux density cannot be obtained and insufficient magnetic characteristic is obtained.

TABLE

|  | Method of present invention | Grinding method | Dry distillation + grinding method | The present product |
|---|---|---|---|---|
| Density (g/cm$^3$) | 5.782 | 5.114 | 5.210 | 5.831 |
| Br (kG) | 6.66 | 4.93 | 5.55 | 6.75 |
| Hci (kOe) | 8.72 | 7.89 | 7.88 | 9.40 |
| BHmax (MGOe) | 8.63 | 3.81 | 5.04 | 9.42 |

As explained in the above, a method for decomposition and treatment of a bond magnet of the present invention can easily decompose the binder in the bond magnet, and the magnetic powder can be recovered separately and reused, as well as the amount of waste to be treated can be reduced.

What is claimed is:

1. A method for decomposition and treatment of a bond magnet formed by blending magnetic material with a binder and molding a product thereof, comprising:

contacting said bond magnet with a decomposition material consisting essentially of an organic solvent capable of decomposing said binder, within a decomposition vessel; and heating said decomposition vessel at a temperature of at least 250° C.

2. A method for decomposition and treatment of a bond magnet according to claim 1, wherein said decomposition material contains at least one solvent selected from the group including ethyleneglycol, propyleneglycol, diethyleneglycol, dipropyleneglycol, isopropyleneglycol, triethyleneglycol, 2-methoxyethanol, 2-ethoxyethanol, 2-(methoxymethoxy)ethanol, 2-isopropylethanol, 2-butoxyethanol, 2-(isopentyloxy)ethanol, 2-(hexyloxy)ethanol, 2-phenoxyethanol, 2-(benzyloxy) ethanol, 1-methoxy-2-propanol, 1-ethoxy-2-propanol, diethyleneglycolmonomethyl ether, diethyleneglycolmonoethyl ether, diethyleneglycolmonobutyl ether, dipropyleneglycolmonomethyl ether, diprolyleneglycolmonoethyl ether, triethyleneglycolmonomethyl ether, tripropyleneglycolmonomethyl ether and tetra-ethyleneglycol.

3. A method for decomposition and treatment of a bond magnet according to claim 1, wherein said removing comprises at least one of
- a replacing process for replacing oxygen in said decomposition vessel with nitrogen gas by supplying said nitrogen gas to said decomposition vessel, and
- a reducing process for exhausting said decomposition vessel and reducing a pressure in said decomposition vessel.

4. A method for decomposition and treatment of a bond magnet formed by blending magnetic material with a binder and molding a product thereof, comprising:
- contacting said bond magnet with a decomposition material within a decomposition vessel, said decomposition material containing at least one solvent selected from the group including tetralin, biphenyl, naphthalene, methylnaphthalene, 1,4-hydroxynaphthalene, naphthol, 1,4-naphthoquinone, pitch, creosote oil, methylisobutyl ketone, isophorone, 2-hexanone, 2-heptanone, 4-heptanone, diisobutylketone, acetonylacetone, phorone, cyclohexanone, methylcyclohexanone and acetophenone;
- heating said decomposition vessel at a temperature of at least 250° C.; and
- removing oxygen from said decomposition vessel, after said contacting said bond magnet with said decomposition material.

5. A method for decomposition and treatment of a bond magnet according to claim 1, wherein
said decomposition material is liquid material and said contacting comprises soaking at least part of said bond magnet in said liquid decomposition material.

6. A method for decomposition and treatment of a bond magnet according to claim 4, wherein
said decomposition material is liquid material and
said contacting comprises soaking at least part of said bond magnet in said liquid decomposition material.

7. A method for decomposition and treatment of a bond magnet according to claim 4, wherein said removing comprises at least one of
- a replacing process for replacing oxygen in said decomposition vessel with nitrogen gas by supplying said nitrogen gas to said decomposition vessel, and
- a reducing process for exhausting said decomposition vessel and reducing a pressure in said decomposition vessel.

8. A method for decomposition and treatment of a bond magnet according to claim 1, wherein said
decomposition material includes one of an antioxidant and a reducing agent.

9. A method for decomposition and treatment of a bond magnet according to claim 4, wherein said
decomposition material includes one of an antioxidant and a reducing agent.

10. A method for decomposition and treatment of a bond magnet according to claim 8, wherein at least one of said antioxidant and said reducing agent includes a compound selected from the group including hydroquinone, methoquinone, benzoquinone, naphthoquinone, butylcatechol, butylhydroquinone, sodium hyposulfite, sodium thiosulfate and ascorbic acid.

11. A method for decomposition and treatment of a bond magnet according to claim 9, wherein at least one of said antioxidant and said reducing agent includes a compound selected from the group including hydroquinone, methoquinone, benzoquinone, naphthoquinone, butylcatechol, butylhydroquinone, sodium hyposulfite, sodium thiosulfate and ascorbic acid.

12. The method according to claim 1, wherein the magnetic material comprises a rare-earth material.

13. The method according to claim 4, wherein the magnetic material comprises a rare-earth material.

14. The method as in claim 1, further comprising removing oxygen from said decomposition vessel during said heating.

15. The method according to claim 4, wherein the magnetic material comprises an alnico material.

16. The method according to claim 4, wherein the magnetic material comprises a ferrite material.

17. The method according to claim 1, wherein the magnetic material comprises an alnico material.

18. The method according to claim 1, wherein the magnetic material comprises a ferrite material.

* * * * *